Aug. 15, 1950  D. W. KELBEL ET AL  2,519,050
TRANSMISSION CONTROL
Filed Oct. 21, 1944  3 Sheets-Sheet 1

Inventors:
Palmer Orr
Donald W. Kelbel and
George E. Flinn

Patented Aug. 15, 1950

2,519,050

UNITED STATES PATENT OFFICE 2,519,050

TRANSMISSION CONTROL

Donald W. Kelbel, George E. Flinn, and Palmer Orr, Muncie, Ind., assignors to Borg-Warner Corporation, Chicago, Ill., a corporation of Illinois Application October 21, 1944, Serial No. 559,852

21 Claims. (Cl. 74—472)

Our invention relates to power transmissions for automotive vehicles, and more particularly the invention relates to controls for such transmissions.

It is an object of our invention to provide an improved control for such transmissions by means of which a transmission is upshifted from a low to an intermediate speed under the control of a governor and the transmission is upshifted from the intermediate to a high speed by releasing the accelerator for the engine of the vehicle in which the transmission is installed and allowing the accelerator to move to its closed throttle position. It is contemplated that the transmission shall preferably be one comprising two friction clutches, one of which is engaged for low speed, the other of which is engaged for second speed and which are both engaged for high speed. The transmission may be of a construction shown in the copending application of Donald W. Kelbel, Serial No. 547,819, filed August 3, 1944, now Patent No. 2,406,225, issued Aug. 20, 1946.

It is another object of our invention to provide an improved control for a transmission which is such that the transmission provides a freewheeling low speed, a positive drive second speed and a positive drive high speed. It is contemplated that, as in the transmission disclosed in the above mentioned Kelbel application, a one-way brake mechanism may be utilized for a reaction element for completing the low and intermediate speed power trains, and it is an object to provide a control which will automatically lock up the one-way brake mechanism when the transmission is conditioned for intermediate speed.

It is another object of our invention to provide an improved control for such a transmission including a reaction element and a one-way brake therefor which permits a downshift from high to intermediate speed and which provides on such a shift a positive drive in intermediate speed when the driven shaft of the transmission tends to drive with the one-way brake mechanism being locked up, so that this positive drive may be used for braking the engine of the vehicle in which the transmission is installed when the vehicle is descending an incline. To this end it is an object of the invention to provide mechanism for momentarily accelerating the engine for engaging the one-way brake mechanism to lock up the brake mechanism, after the transmission has been otherwise conditioned for intermediate speed drive.

It is contemplated that our invention may be used with a transmission, such as is disclosed in the above mentioned Kelbel application, in which friction clutches are used for completing the drives through the transmission and in which these clutches are operated by fluid under pressure. It is contemplated that a pump shall be provided for supplying fluid under pressure for engaging these clutches and for lubricating the gearing of the transmission, and the pump may draw fluid from a sump beneath the gearing and may be driven from the drive shaft of the transmission. It is contemplated also that another pump driven by an element of the gearing may be provided for draining a sump located beneath the fluid pressure engaged clutches.

It is a further object of our invention to provide improved transmission control mechanism which will allow a completion of a power train through this transmission, by means of the above mentioned fluid pressure operated clutches, from the driven shaft of the transmission to the drive shaft for starting the engine connected with the drive shaft by driving the driven shaft, as by pushing the vehicle. Since, when the engine is not in operation, the pump for engaging the clutches also is not in operation, the invention contemplates that other means may be utilized for providing the necessary fluid pressure for engaging the clutches. To this end, it is an object of the invention to provide a valve arrangement for connecting the clutch sump pump with the sump for the gearing and for connecting this pump to provide the fluid pressure for engaging one of the clutches in order to complete a power train from the driven shaft to the drive shaft of the transmission when the engine is inoperative.

The invention consists of the novel construction, arrangements and devices to be hereinafter described and claimed for carrying out the above stated objects and such other objects as will appear from the following description of a certain preferred embodiment illustrated in the accompanying drawings, wherein:

Like characters of reference designate like parts in the several views.

Figure 1:
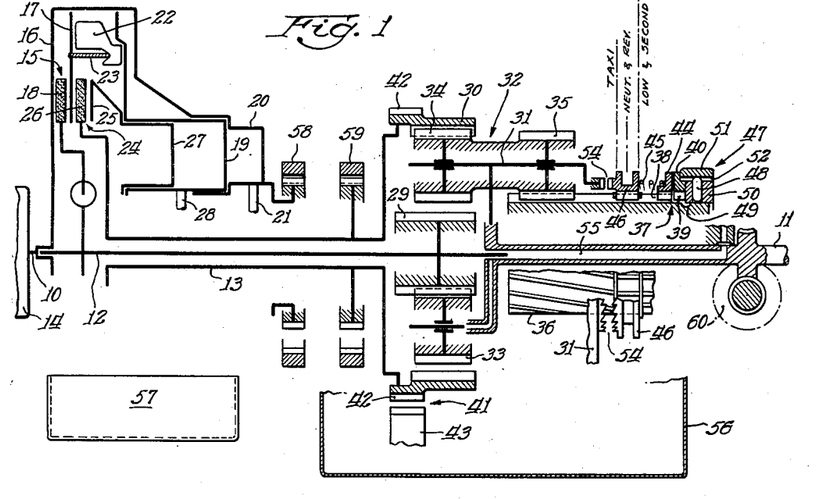
Fig. 1 is a diagrammatic illustration of the transmission disclosed in the above Kelbel application and with which our improved transmission control may be used.
Figure 4:
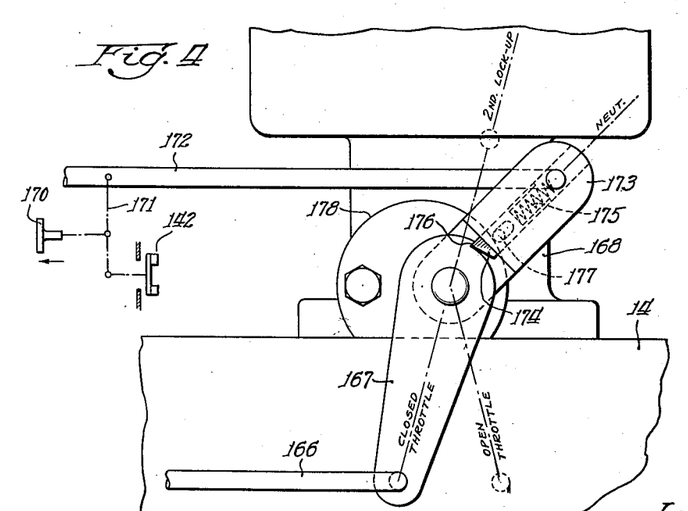
Fig. 4 is a view showing the engine including its carburetor which drives the illustrated transmission, with the view showing the carburetor connected with certain control mechanism.

Referring now to the drawings and particularly to Figs. 1 and 4 thereof, the transmission with which our improved control arrangement may be used comprises a drive shaft 10, a driven shaft 11, an intermediate shaft 12 piloted in the shafts 10 and 11, and a second intermediate shaft 13 coaxial with and disposed about the shaft 12. The transmission is intended for use in an automotive vehicle, and the drive shaft 10 is connected with and is driven by an automobile engine 14 of the usual internal combustion type.

A friction clutch 15 is provided for connecting the shaft 12 with the shaft 10. This clutch comprises a flywheel 16 connected with shaft 10, a pressure plate 17 movable toward and from the flywheel 16 but being non-rotatable with respect thereto and a friction disc 18 between the flywheel and pressure plate and connected with the shaft 12. The clutch 15 is adapted to be conditioned for engagement by the application of fluid, such as oil, under pressure to a piston 19, and the clutch is thereafter automatically engaged when the speed of the drive shaft 10 reaches a predetermined value. The piston 19 is slidably but non-rotatably disposed in a housing 20 connected to rotate with the flywheel 16 and the shaft 10, and a fluid conduit 21 is provided for applying fluid under pressure to the piston. The piston 19 is arranged to act on a plurality of centrifugal weights 22 to move the weights toward the flywheel 16 on application of fluid pressure to the piston. The weights 22 are each connected with the pressure plate 17 by means of a strut 23 for acting on the pressure plate, and the weights 22 are connected so as to rotate with the flywheel 16. The weights 22 move outwardly under the action of centrifugal force due to their rotation along with the flywheel 16 and shaft 10, and the weights by means of the struts 23 function to move the pressure plate 17 toward the flywheel 16. The piston 19 functions to move the weights 22 and thereby the pressure plate 17 a certain distance toward the flywheel 16 to thereby condition the clutch 15 for engagement, and the weights 22 function to move the pressure plate 17 in the same direction the necessary additional distance to engage the friction disc 18 between the pressure plate 17 and the flywheel 16 to engage the clutch at a predetermined speed of the drive shaft 10. The clutch may be disengaged by draining the fluid from behind the piston 19 thus relieving the force on struts 23 and weights 22, as the weights 22 themselves cannot cause a sufficient movement to the pressure plate 17 to engage the clutch.

A friction clutch 24 is provided for connecting the intermediate shaft 13 with the drive shaft 10. This clutch comprises the pressure plate 17, a pressure plate 25 and a friction disc 26 between the two pressure plates and connected with the shaft 13. A piston 27 is provided within the piston 19, and a conduit 28 is provided for applying a fluid, such as oil, under pressure to the piston 27. The clutch 24 is engaged by applying fluid pressure to the piston 27 through the conduit 28 and this causes movement of the pressure plate 25 toward the pressure plate 17 to engage the friction disc 26 between the pressure plates. The clutch 24 may be so engaged whether the friction clutch 15 is engaged or disengaged.

The shaft 12 is connected with a sun gear 29; the shaft 13 is connected with a ring gear 30; and the shaft 11 is connected with a planet gear carrier 31, the parts 29, 30 and 31 all being parts of a planetary gear set 32. The gear set 32 comprises also a planet gear 33, which is in mesh with the sun gear 29 and is rotatably carried by the carrier 31, and a planet gear 34, which is in mesh both with the planet gear 33 and with the ring gear 30 and is carried by the carrier 31. The planet gear 34 has a planet gear 35 integrally connected therewith and carried by the carrier 31. This planet gear 35 is a spiral gear, and it is in mesh with a spiral sun gear 36. A positive type brake 37 is provided for holding the sun gear 36 stationary, and this brake comprises teeth 38 formed on the sun gear and teeth 39 formed in a stationary part 40. The teeth 38 are interengaged with the teeth 39 on movement of the sun gear 36 rearwardly, and the brake 37 is thus engaged. A positive brake 41 is provided for holding the ring gear 30 stationary. This brake comprises teeth 42 formed on the ring gear and a pawl 43 which is non-rotatably disposed with respect to the ring gear and which is movable into engagement with the teeth 42.

The planetary gear set 32 may be controlled to provide low and intermediate reduced speed ratios and a direct drive, all in the forward direction, between the shafts 10 and 11 and to provide a reduced speed ratio in the reverse direction between the shafts. When the sun gear 36 is held stationary, as by the brake 37, and the shaft 12 is driven by the shaft 10 by means of the clutch 15, the carrier 31 and thereby the shaft 11 are driven at low speed ratio in forward drive. The sun gear 36 in this case functions as a reaction element. When the sun gear 36 is held stationary and the shaft 13 is driven from the shaft 10 by means of the clutch 24, with the clutch 15 being disengaged, the shaft 11 is driven at intermediate speed ratio in forward drive, and the sun gear 36 in this case also acts as a reaction element. When both of the clutches 15 and 24 are engaged whereby both of the shafts 12 and 13 are driven from the shaft 10, the planetary gear set 32 is locked up, and the shaft 11 is driven in direct drive at the same speed as the shaft 10. For this direct drive, the brake 37 is disengaged, and the sun gear 36 rotates along with the other parts of the planetary gear set. For reverse drive, the clutch 15 is engaged, the brake 41 is engaged and the brake 37 is disengaged. The planetary gear set 32 with these conditions existing will drive the shaft 11 at a reduced speed in reverse drive with respect to the shaft 10, and the ring gear 30 in this case functions as the reaction element for the planetary gear set.

The sun gear 36 is moved longitudinally thereof in one direction or the other according to the direction of reaction thereon by the gear 35 for either engaging or disengaging the brake 37, so that the sun gear 36 is effectively braked for one direction of reaction thereon and may freely rotate for the other direction of reaction. The spiral gearing on the sun gear 36 and on the planet gear 35 functions to move the sun gear in this manner. A blocker element 44 is provided on the sun gear, and this may be of any suitable type and has limited oscillatory movement with respect to the sun gear. The blocker 44 is in frictional engagement with the stationary part 40 and is held in such engagement by means of a spring 45 acting between the blocker element and a collar 46 fixed on the sun gear 36. The blocker 44 is so arranged that when the sun gear 36 is rotated in a direction reverse with respect to the direction of rotation of the drive shaft 10, the blocker allows engagement of the teeth 38 with the teeth 39 to engage the positive brake 37 and when the sun gear 36 rotates in the opposite direction, that is, in the same direction as the drive shaft 10, in this case the blocker 44 functions to block rearward longitudinal movement of the sun gear 36 and prevents engagement of the teeth 38 with the teeth 39. The direction of the spiral gearing on the gears 35 and 36 is such that when the reaction on the sun gear 36 is such as to rotate it in the direction reverse to the direction of rotation of the shaft 10, the sun gear is moved rearwardly on the transmission. Rotation of the sun gear 36 in this direction causes the blocker element 44 to allow engagement of the teeth 38 with the teeth 39, and the former teeth move with longitudinal rearward movement of the sun gear 36 into engagement with the stationary teeth 39 to engage the brake 37. The frictional contact of the blocker element 44 on the stationary part 40 caused by the spring 45 tends to frictionally retard rotation of the sun gear 36 and promotes longitudinal movement of the sun gear by the spiral gearing. When the direction of reaction on the sun gear 36 is in the opposite direction, that is, in the same direction as the direction of rotation of the shaft 10, the spiral gearing on the gears 35 and 36 causes the gear 36 to move forwardly of the transmission to move the teeth 38 out of engagement with the teeth 39 for disengaging the brake 37.

The sun gear 36 and the positive brake 37, functioning as above described as a one-way brake mechanism, act to complete the low and intermediate reduced speed ratios through the transmission and to disengage at high speed ratio. When the clutch 15 is engaged, the reaction on the sun gear 36 is in the reverse direction, and the sun gear is thus moved rearwardly to engage the positive brake 37, and the low speed ratio is thereby completed through the transmission. When the clutch 15 is disengaged and the clutch 24 is engaged, the reaction on the sun gear 36 is in the same direction, and the positive brake remains engaged and completes the intermediate speed power train through the transmission. When both of the clutches 15 and 24 are engaged to complete direct drive ratio through the transmission, the reaction on the sun gear 36 is in the opposite direction, that is, in the forward direction, and the sun gear 36 moves forwardly of the transmission to disengage the brake 37. No reaction is needed for the planetary gearing 32 in direct drive, and the reaction gear 36 is free to rotate with the other elements of the planetary gearing.

Figure 2:
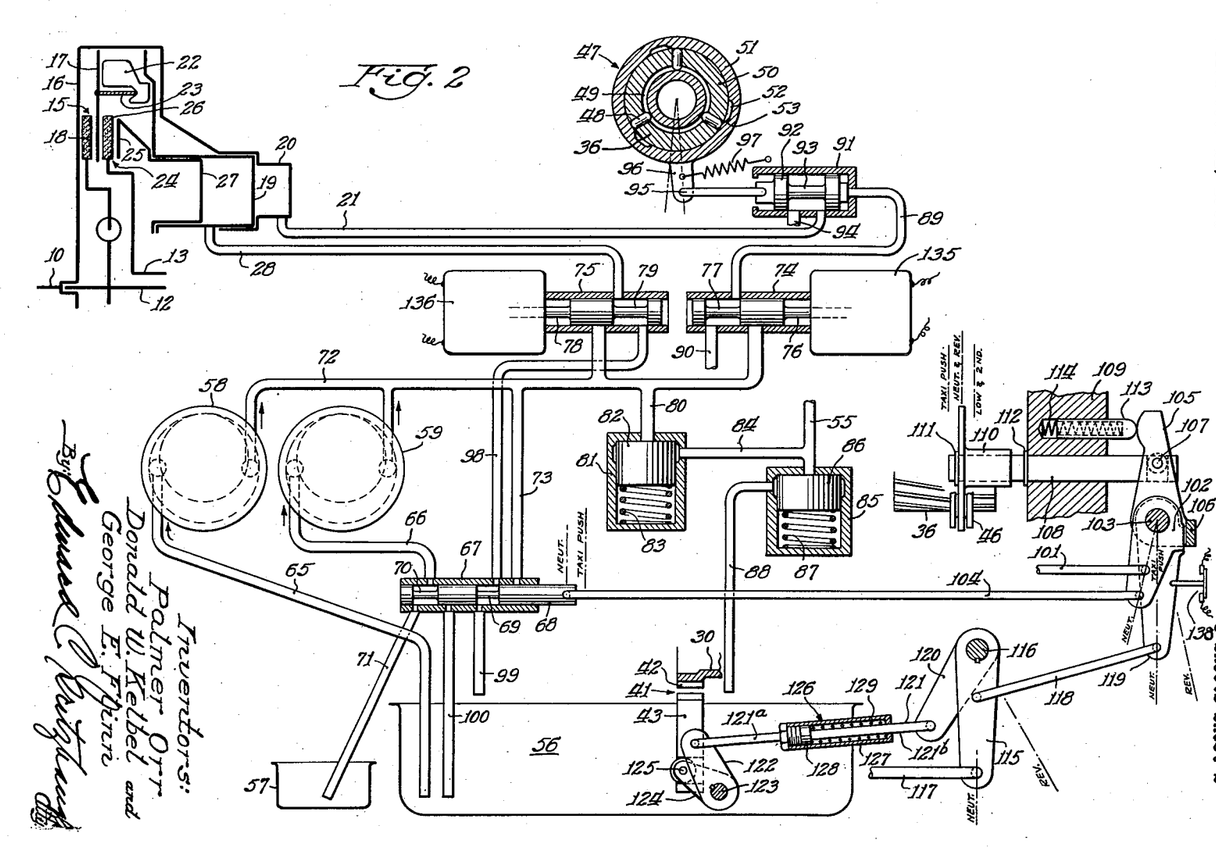
Fig. 2 is a diagrammatic view of the hydraulic portion of our improved transmission control.

A retaining mechanism 47 is provided for acting at appropriate times for holding the sun gear 36 in its position in which the positive brake 37 is engaged. The retaining mechanism 47 comprises bean-like elements 48 which are adapted to fit in a groove 49 provided in the sun gear 36. The beans 48 are slidably disposed in the stationary part 50, and a sleeve 51 (see Fig. 2) is rotatably disposed about the part 50. The sleeve 51 is provided with notches 52 in its inner periphery, and these notches are provided with cam portions 53, as shown in Fig. 2. The notches 52 are positioned so as to receive the beans 48 when the sleeve 51 is in a certain rotative position on the stationary part 50, as will be apparent from an inspection of this construction as shown in Fig. 2, and in this case the retaining mechanism 47 is unlocked and the sun gear 36 is free to move longitudinally thereof. When the teeth 38 are interengaged with the teeth 39, the groove 49 in the sun gear 36 is beneath the beans 48 and on rotation of the sleeve 51 to its position as shown in Fig. 2, the cam portions 53 in the sleeve 51 function to move the elements 48 into the groove 49, and the sleeve 51 thereafter functions to hold the elements 48 in the groove and to thereby hold the sun gear 36 against forward longitudinal movement which would disengage the brake 37. It will thus to apparent that the retaining mechanism 47 functions to hold the brake 37 engaged and thereby functions as means for locking up the one-way brake comprising the positive brake 37 and the spiral gearing on the gears 35 and 36 so that the gear 36 is held from rotation in both directions rather than in only the reverse direction.

Clutch teeth 54 are provided between the collar 46 fixed to the sun gear 36 and the planet gear carrier 31 for making possible a direct drive from the shaft 11 to the shaft 10 with only one of the friction clutches 15 and 24 being engaged. Such a drive is useful for starting the engine 14, when the engine is inoperative, by rotating the shaft 11, as by pushing the automobile in which the transmission is installed. The clutch 15 is, as has been hereinbefore described, a centrifugal clutch which is engaged only after the drive shaft 10 has reached a predetermined speed, and it is thus not possible to use this clutch in providing such a direct drive from the shaft 11 to the shaft 10. If the friction clutch 24 is engaged, and if the shaft 11 is driven in the forward direction, the reaction on the sun gear 36 is in the forward direction, and the spiral gear teeth on the sun gear 36 and on the planet gear 35 function to move the sun gear forwardly of the transmission. Such forward movement of the sun gear brings the collar 46 toward the gear carrier 31 to engage the teeth 54. The teeth 54 are so slanted as to engage with the sun gear 36 rotating in the forward direction, and with the teeth 54 engaged, the planet gear set 32 is locked up, and a drive is completed from the shaft 11 through the gear set and through the intermediate shaft 13 and the friction clutch 24 to the drive shaft 10. When the engine 14 becomes operative, and the shaft 10 is driven, the reaction on the sun gear 36 reverses, and the teeth 54 are slanted so as to function with the spiral teeth on the gears 36 and 35 to move the sun gear 36 rearwardly whereby the teeth 54 are disengaged. One of the forward drive ratios may then be completed through the transmission, as has been hereinbefore described.

The planetary gear set 32, and particularly the planet gears, are lubricated by means of an oil passage 55 provided in the shaft 11 and extending through the planet carrier 31. Any oil that may be thrown from the gear set 32 is collected in a gearing oil sump 56 provided below the gearing. An oil sump 57 is also provided for the clutches 15 and 24 for collecting any oil which may leak from behind the pistons 19 and 27.

The transmission is provided with two oil pumps for providing fluid under pressure for controlling the transmission, as will be hereinafter described. One of the pumps 58 is driven from the housing 20, and this pump thus is only effective when the shaft 10 is rotating. The other of the pumps 59 is connected with the intermediate shaft 13, and this pump thus is operative when the ring gear 30 is rotating. A governor 60 is driven from the driven shaft 11, and this governor functions in controlling the transmission as will be hereinafter described.

For more of the details of construction of the transmission as it has been so far described, the copending application of Donald W. Kelbel, hereinabove mentioned, may be referred to.

Referring now particularly to Fig. 2 for a description of the hydraulic portion of the transmission control arrangement, it will be observed that the pump 58, which is driven by the shaft 10, has its inlet connected with the gearing sump 56 by means of a conduit 65. The pump 59 driven with the ring gear 30 has its inlet connected, by means of a conduit 66, with a valve 67. The valve 67 comprises a piston 68 having constricted portions 69 and 70. The valve 67 is connected by a conduit 71 with the clutch unit sump 57, and in the normal position of the piston 68, in which it is shown in the drawing, the constricted portion 70 connects the conduits 66 and 71 so that the pump 59 when in operation draws fluid from the sump 57.

The pumps 58 and 59 discharge into a single conduit 72, which, as will be described, is connected to function as a source of fluid pressure both for lubricating the gearing 32 and for engaging the clutches 15 and 24. It will be noted that conduit 72 is connected by a conduit 73 with the valve 67; however, in the normal position of the valve piston 68 in which it is shown, the conduit 73 is blocked by the piston. The conduit 72 is connected with a valve 74 which may be termed a low and direct speed valve, and the conduit is also connected with a valve 75 which may be termed a second speed valve. The valve 74 comprises a valve piston 76 which has a constricted portion 77, and the valve 75 comprises a valve piston 78 having a constricted portion 79. In the neutral positions of the valve pistons 76 and 78, in which they are shown in the drawing, the branches of the conduit 72 connected with the valves are blocked by the pistons, as shown.

The conduit 72 is connected by a conduit 80 with a pressure relief valve 81 which comprises a slidable piston 82 acted on by a spring 83. The valve 81 has an outlet connected with a conduit 84, and this conduit is connected with a second pressure relief valve 85 and also with the passage 55 in the driven shaft 11. The valve 85 is quite similar to the valve 81 and comprises a slidable piston 86 acted on by a spring 87. The valve 85 has a discharge outlet which is connected with a conduit 88 leading to the gearing sump 56. The pressure relief valve 81 remains closed until the fluid pressure in the conduit 80 and thereby in the conduit 72 has reached a predetermined value, and when the pressure exceeds this value, the piston 82 moves downwardly to open the outlet of the valve, and the fluid discharges through the conduit 84 to the valve 85. The valve 85 functions similarly to the valve 81 and maintains the fluid pressure within the conduits 84 and 55 at a certain predetermined value; the fluid pressure in the conduits 84 and 55 maintained by the valve 85 is, however, less than the fluid pressure which the valve 81 maintains in the conduits 80 and 72. The fluid under pressure in the conduit 55, as has been hereinabove described, acts to lubricate the gearing 32 and particularly the planet gears 33, 34, and 35.

The valve 74 is connected with a conduit 89 and a conduit 90. The conduit 89 is connected to operate certain fluid pressure responsive mechanism including the clutch 15, and the conduit 90 is disposed to discharge fluid into the sump 56 to thus constitute a bleed conduit. In the inoperative position of the piston 76 in which it is shown, the constricted portion 77 of the piston connects the conduits 89 and 90 whereby fluid may freely discharge from the conduit 89. The conduit 89 is connected with a valve 91 which comprises a piston 92 having a constricted portion 93. The valve 91 is connected with a bleed conduit 94 disposed to discharge fluid into the sump 56, and the valve is also connected with the conduit 21 leading to the clutch housing 20 behind the piston 19. The piston 92, in its inoperative position in which it is shown, functions to connect by means of its constricted portion 93, the conduit 21 with the conduit 94 whereby fluid in the housing 20 and behind the piston 19 of the clutch unit and in the conduit 21 may freely discharge into the sump 56. The piston 92 is connected by a link 95 with a lug 96 formed on the sleeve 51, provided for acting on the bean-like elements 48. A spring 97 is provided between any stationary part and the lug 96 for yieldingly holding the sleeve 51 and the piston 92 connected therewith in their positions in which they are shown.

The valve piston 76 in its operative position functions to connect the conduits 72 and 89 by means of its constricted portion 77 while disconnecting these conduits 89 from the bleed conduit 90. When the conduits 72 and 89 are thus connected, fluid under pressure is applied to one end of the piston 92 to move the piston toward the left as seen in the drawing and to rotate the sleeve 51 in a clockwise direction against the action of the spring 97. This movement of the sleeve brings the notches 52 in the sleeve in alignment with the bean-like elements 48 to allow movement of these elements in the stationary part 50. The sun gear 36, with these parts being in this condition, may freely move longitudinally to either engage or disengage the positive brake 37. When the piston 92 is in this position, the piston allows communication between the conduits 89 and 21, and fluid under pressure flows through the latter conduit and into the clutch housing 20 to condition the clutch 15 for engagement. Application of fluid pressure to the conduit 89 by means of the valve 74 thus causes a movement first of the piston 92 to disengage the holding mechanism 47 for the sun gear 36 and then a subsequent conditioning of the clutch 15 for engagement. When the piston 76 is moved back to its inoperative position in which it is shown, fluid in the conduit 89 discharges through the bleed conduit 90, and the piston 92 and thereby the sleeve 51 moves back to its position in which it is shown in the figure, assuming that the brake 37 is engaged and the groove 49 is beneath beans 48. When the piston 92 has moved back to this position, its constricted portion 93 connects the conduits 21 and 94 and fluid may discharge from behind the piston 19 through the conduit 21 to disengage the clutch 15. Thus, when the valve piston 76 is moved back to its position in which it is shown in the drawing, the holding mechanism 47 is first engaged and subsequently the clutch 15 is disengaged.

The valve 75 is connected with the conduit 28 leading to the piston 27 in the clutch unit and also with a conduit 98 connected with the valve 67, as shown. The valve 67 is connected with a conduit 99 disposed to discharge fluid into the sump 56 to thus constitute a bleed conduit, and in the normal position of the valve piston 68, its constricted portion 69 connects the conduits 98 and 99. Thus, with the valve pistons 68 and 78 in their positions as shown in Fig. 2, fluid may freely discharge from behind the piston 27 in the clutch unit through the conduits 28, 98, and 99 into the sump 56. When the valve piston 79 is moved to its operative position, its constricted portion 79 functions to disconnect the conduit 28 from the conduit 98 and to connect the conduit 28 with the fluid supply conduit 72. Fluid under pressure is thereby supplied through the conduit 28 to the clutch piston 27 for engaging the clutch 24. On a return of the piston 78 to its inoperative position as shown, fluid is discharged from behind the piston 27 through the conduit 28 to again disengage the clutch 24.

The valve 67 has a conduit 100 extending to the gearing sump 56 to thereby constitute a bleed conduit. The valve 67 may be termed a taxi-push valve, and this valve is adapted to be moved to the right when the operator desires to condition the transmission for taxi-push for starting the engine 14 by driving the driven shaft 11. When the valve piston 68 is moved to the right, its constricted portion 70 functions to disconnect the conduit 66 from the conduit 71 and to connect the conduit 66 with the conduit 100, so that the input of the pump 59 is connected with the sump 56 instead of the sump 57. Movement of the valve piston 68 in this direction also functions to disconnect the conduit 98 from the bleed conduit 99 and to connect the conduits 73 and 98 by means of the constricted portion 69 of the valve piston. When the motor 14 is inoperative, the pump 58 is also inoperative, since this pump is driven from the drive shaft 10; however, the pump 59 is operative when the driven shaft 11 is driven, as when the vehicle in which the transmission is installed is pushed. When the valve piston 68 is in this position, the pump 59 supplies fluid under pressure to the conduit 72 and draws the fluid from the gearing sump 56. When the transmission is conditioned for taxi-push, the valve pistons 76 and 78 are both in their positions as shown in the figure so that fluid from the conduit 72 cannot directly pass through these valves into either the conduits 28 or 89; however, the valve piston 68 when moved to the right functions to connect the conduit 72 with the piston 27 by means of the conduit 73, the constricted portion 69 of the valve 68, the conduit 98, the constricted portion 79 of the valve piston 78 and the conduit 28, so that the friction clutch 24 is engaged to complete a drive from the gearing to the drive shaft 10.

The taxi-push valve 67 is controlled by a control link 101 which is connected with any suitable controlling mechanism (not shown) readily accessible to the operator. The link 101 is connected with a lever 102 rotatably disposed on a stationary shaft 103, and the valve piston 68 is connected by means of a link 104 with the lever 102. The arrangement is such that when the link 101 is moved to the right as seen in Fig. 2, such movement gives counterclockwise rotation to the lever 102 about the shaft 103, and the lever through the link 104 moves the valve piston 68 to the right in order to put the valve 67 in condition for taxi-push. Another lever 105 is rotatably mounted on the shaft 103 and is provided with a lug 106 which is so arranged as to be contacted by the lever 102 when the latter lever is given counterclockwise movement. The lever 105 has a pin and slot connection 107 with a shift rail 108 which is slidably disposed in a stationary part 109. A fork 110 is disposed on the shift rail 108, and his fork fits in the groove provided in the collar 46 fixed on the sun gear 36. The fork 110 is slidably disposed on the shift rail, and its movement on the rail is limited by a ring 111 on one end and a ring 112 at the other end of the fork, both rings being fixed to the rail. The rings thus provide a lost motion connection between the fork and the shift rail. The lever 105 cooperates with a plunger 113 slidably disposed in a suitable cavity in the stationary part 109 so that the plunger limits the counterclockwise movement that may be given the lever 105. The plunger 113 has a spring 114 acting thereon tending to move the lever to its position as shown in the figure, and the plunger 113 engages the bottom of the cavity in which it is disposed in order to limit the counterclockwise movement of the lever 105.

When the taxi-push lever 102 is moved by means of the control link 101 in a counterclockwise direction, it abuts against the lug 106 and thereby moves the lever 105 in the counterclockwise direction. Such movement of the lever 105 by means of pin and slot connection 107 moves the shift rail 108 toward the left as seen in the figure, and such movement of the rail 108 allows the fork 110 to move to the left of its neutral and reverse position indicated in the figure to its taxi-push position. The movement of the fork 110 between these two positions is caused by the reaction on the sun gear 36 in the forward direction which occurs when the shaft 11 is driven with the clutch 24 being engaged, and on this movement of the sun gear, the teeth 54 become engaged, as has been hereinbefore described. While the lever 102 remains in its taxi-push position, the sun gear 36, the collar 46, and the fork 110 may move to the right when the engine 14 has been started, due to the lost motion connection between the fork and the shift rail 108.

The lever 105 is also adapted to be moved in the counterclockwise direction when the transmission is conditioned for reverse drive. A control lever 115 fixed to a shaft 116 and connected with a control link 117 is utilized for conditioning the transmission for reverse. The link 117 is intended to be connected with any suitable control mechanism (not shown) accessible to the operator for so conditioning the transmission. The lever 115 is connected by a link 118 with a lever 119 which is rotatably disposed on the shaft 103. The lever 119 is also adapted to abut against the lug 106, and when the levers 115 and 119 are moved to their reverse positions by actuation of the control link 117, the lever 119 acts against the lug 106 and moves the lever 105 counterclockwise to the limit of its movement. Such movement of the lever 105 causes corresponding movement of the shift rail 108 and the ring 112 fixed thereon to the left and thereby prevents movement of the shift fork 110 to its low and second speed position indicated in the figure in which the positive brake 37 may be engaged. As has been hereinbefore described, when the transmission is conditioned for reverse with the brake 41 engaged, the direction of reaction on the sun gear 36 is in the reverse direction, whereby there is a force on the sun gear tending to move the gear rearwardly of the transmission. The ring 112 prevents such movement of the sun gear 36 rearwardly so that the brake 37 cannot become engaged with reverse drive through the transmission.

The brake 41 is also engaged by movement of the lever 115 by means of the control link 117. A lever 120 is fixed on the shaft 116 and thereby moves with the lever 115, and the former lever is connected by means of a link 121 with a lever 122. The lever 122 is fixed to a shaft 123 and another lever 124 is also fixed to this shaft. The lever 124 has a roller and slot connection 125 with the pawl 43, so that when the link 121 is moved to the right as seen in the figure, the levers 122 and 124 will be given clockwise rotation, and the pawl 43 will be moved to engage with the teeth 42 in the ring gear 30. A lost motion connection 126 comprising a barrel 127 fixed with respect to one part 121a and a plunger 128 fixed on the other part 121b of the shaft 121 is provided in the shaft. The lost motion connection comprises also a spring 129 in the barrel acting between the plunger 128 and the end of the barrel, and the arrangement is such that although the pawl 43 may be butt-ended with one of the teeth 42 on the ring gear 30 to prevent engagement of the brake 41, the levers 115 and 120 may nevertheless be moved to their reverse positions. The spring 129 will yield and will allow an effective lengthening of the link 121 to effect this result. When the ring gear 30 rotates slightly to bring the pawl and tooth out of butt-ended relationship, the spring 129 will move the levers 122 and 124 and the pawl 43 to interengage the pawl with the teeth 42.

Figure 3:
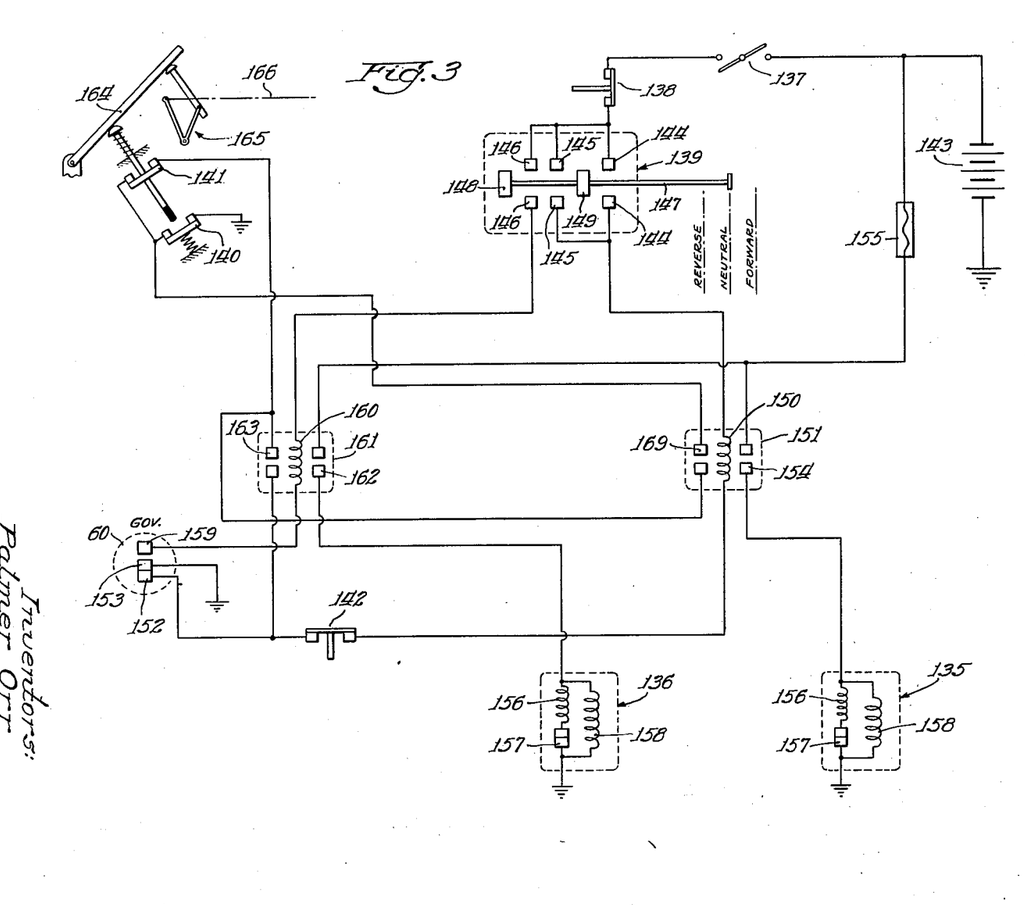
Fig. 3 is a diagrammatic view of the electrical portion of the transmission control.

Referring now to Figs. 2, 3, and 4 and particularly to Fig. 3, the electrical portion of the transmission control arrangement will now be described. The valve piston 76 of the low and direct valve 74 is controlled by means of a solenoid 135 which when energized functions to move the piston to its position in which it connects the conduits 72 and 89. The valve piston 78 of the second speed valve 75 is controlled by a solenoid 136 which when energized functions to move the valve piston 78 to its position in which it connects the conduits 72 and 28. The electrical portion of the control arrangement includes an ignition switch 137, a taxi-push switch 138, a forward and reverse switch 139, a kickdown switch 140, a closed throttle switch 141, a second speed lock-up switch 142, and the governor 60, all operative as controls for the arrangement.

The battery 143 of the vehicle in which the transmission is installed and which has one terminal grounded, as shown, has its other terminal connected with the ignition switch 137, and the ignition switch is connected in series with the taxi-push switch 138. The ignition switch 137 is controlled by the operator and may be conveniently located for such control in accordance with well known practice, and the taxi-push switch 138 is controlled by the lever 102 rotatably disposed on the shaft 103 and under the control of the link 101. The switch 138 is so arranged with respect to the lever 102 that the switch is opened when the lever 102 is moved into its taxi-push position. The switch 138 is connected in series with contacts 144, 145, and 146 of the switch 139, as shown. The switch 139 comprises a switch arm 147 having contact blades 148 and 149 thereon, and this switch is intended to be controlled by the operator and may be connected with any suitable mechanism (not shown) to facilitate such control in conjunction with the control link 117 for the reverse lever 115. The switch arm 147 has three positions, namely, neutral, forward, and reverse. In the neutral position of the switch arm in which it is shown, the contacts 144, 145, and 146 are all disconnected. When the switch arm 147 is moved to its forward position as indicated in the drawing, the switch blade 149 connects the contacts 144 and the switch blade 148 connects the contacts 146. When the switch arm 147 is moved to its reverse position as indicated, the blade 149 connects the contacts 145.

The contacts 144 are connected with the winding 150 of a relay 151, and the winding 150 is connected with the second speed lock-up switch 142. The switch 142 is actuated as will be hereinafter described, and it is connected with a contact 152 of the governor 60. Below a predetermined speed of the vehicle in which the transmission is installed, as for example ten miles per hour, the contact 152 completes a circuit with a contact 153 of the governor which is grounded as shown. With the switch 139 being conditioned for forward drive, a circuit is completed by the contacts 152 and 153 through the winding 150 to energize the relay 151 below this predetermined speed.

The relay 151 comprises contacts 154 which are brought together upon energization of the relay and which are connected with the solenoid 135. The contacts 154 when together complete a circuit from the battery 143 through a fuse 155 and through the contacts to the solenoid 135 which is grounded. The solenoid 135 comprises an energizing winding 156, contacts 157 and a holding winding 158. The winding 156 and the contacts 157 are connected in series and the winding 158 is in parallel with the winding 156 and the contacts 157, as shown. When the contacts 154 are closed, the winding 156 is energized to pull the valve piston 76 into its operative position connecting the conduits 72 and 89, and the contacts 157 are so arranged with respect to the piston that such movement of the piston has the effect of opening the contacts 157 to break the circuit through the winding 156. When the valve piston is in its operative position, a current through the parallel holding winding 158 is sufficient to hold the piston in this position, and the piston thus remains in this position. Thus, when the relay 151 is energized, the solenoid 135 is also energized to supply fluid pressure to the valve 91 and to the clutch piston 19 for conditioning the clutch 15 for engagement.

When the speed of the vehicle has increased above the critical speed of the governor 60, the contact 153 separates from the contact 152 and makes contact with another contact 159 of the governor. This breakage between the contacts 152 and 153 functions to deenergize the relay 151 and thereby the solenoid 135, as will be understood, so that the valve piston 76 moves back to its inoperative position to disengage the clutch 15. In the forward condition of the switch 139, the switch blade 148 connects the contacts 146, and these contacts are connected with a winding 160 of a relay 161. The winding 160 is connected with the contact 159, and upon the contacts 153 and 159 coming together, the relay 161 is energized by a circuit from the battery 143 through the switches 137 and 138, the contacts 146, the winding 160 and the contacts 153 and 159. The relay 161 includes contacts 162, and when the relay is energized, these contacts are brought together. The contacts 162 are connected with the battery 143 through the fuse 155, and the contacts are also connected with the solenoid 136. The solenoid 136 includes windings 156 and 158 and contacts 157 similar to the corresponding parts in the solenoid 135, and the contacts 162 when thus closed complete a circuit through the solenoid 136 and energize the solenoid to move the valve piston 78 into its operative position to connect the conduits 72 and 28, whereby to engage the clutch 24 and put the transmission in second speed ratio.

The second speed relay 161 also includes contacts 163 which are brought together when the solenoid is energized. One of these contacts is connected with the winding 150 of the relay 151 through the second speed lock-up switch 142, and the other of the contacts is connected with the switch 141 and thereby with the switch 140 and through the latter switch with ground.

The switches 141 and 140 are controlled by means of the accelerator 164 for the vehicle. The accelerator is connected by any suitable mechanism 165 and including a link 166 with the throttle lever 167 of the carburetor 168 for the engine 14 (see Fig. 4). The mechanism linking the accelerator 164 and the throttle lever 167 is intended to be of the ordinary type in common use, so that the throttle is opened upon a depression of the accelerator and is closed upon the accelerator being returned to its uppermost position. When the accelerator is in its closed throttle position, the switch 141 is closed, and the switch 140 is also closed. When the accelerator is depressed to open the throttle, the switch 141 is opened. The switch 140 normally is closed and is opened when the accelerator 164 is depressed to its fully open throttle position.

When the speed of the vehicle increases such that the contact 153 of the governor 60 moves out of contact with the contact 152 and into contact with the contact 159, the accelerator 164 is normally depressed to some extent, to at least partially open the throttle. Under these conditions the relay 161 and solenoid 136 are energized, and the relay 151 and solenoid 135 are de-energized, as has been described. When the accelerator 164 is thereafter released to close the switch 141, a circuit is thereupon completed through the winding 150 of the relay 151. The circuit includes the switch 142 connected with the winding, the contacts 163 of the relay 161 which remains energized, the switch 141 and the switch 140 to ground. The relay 151 is thus energized to close its contacts 154, and the solenoid 135 is again energized to move the valve piston 76 into operative position connecting the conduit 72 and the conduit 89. Thus upon such release of the accelerator above the critical speed of the governor, both of the valve pistons 76 and 78 are in their operative positions, both of the clutches 15 and 24 are engaged, and the transmission is in direct drive. The relay 151 also includes contacts 169, closed when the relay is energized, and one of these contacts is connected with one of the contacts 163 and between the latter contacts and the switch 141, and the other of the contacts 169 is connected with the switch 140, as shown. When the accelerator 164 is thereafter depressed to open the throttle further to increase the speed of the vehicle, the relay 151 remains energized regardless of the opening of the switch 141, and the circuit from the winding 150 of this relay is through the switch 142, the contacts 163, the contacts 169, and the switch 140 to ground. Both of the solenoids 135 and 136 thus remain energized and both of the valve pistons 76 and 78 remain in their operative positions to keep the transmission in direct drive.

While the speed of the vehicle remains above the critical governor speed, and if the operator desires to disengage to shift the transmission to second speed, the operator may depress the accelerator 164 to open throttle position to open the switch 140. Such opening of the switch 140 opens the circuit through the winding 150 of the relay 151 and de-energizes the relay and thereby also de-energizes the solenoid 135, and the valve piston 76 returns to its inoperative position in which it is shown in Fig. 2. The relay 151 and the solenoid 135 remain de-energized when the accelerator 164 is released from its open throttle position, since the contacts 169 are open and since the switch 141 is open, and the automobile thus remains in second speed. The transmission may again be shifted back into high speed by entirely releasing the accelerator 164 to close the switch 141.

When the switch 139 is conditioned for reverse, the switch blade 149 completes a circuit across the contacts 145, and through the winding 150 of the relay 151, the switch 142 and the contacts 152 and 153 to ground. The relay 151 is thereby energized and the solenoid 135 is also energized whereby the piston 76 is in its operative position and the clutch 15 is conditioned for engagement. The control lever 115 and its connected parts are also conditioned for reverse drive, and the shaft 11 is driven in reverse from the shaft 10 through the transmission as has been hereinbefore described. In this condition of the switch 139, the contacts 146 are open, and the relay 161 and the solenoid 136 cannot be energized.

When the transmission is conditioned for taxi-push for starting the engine 14 by shifting the lever 102, the switch 138 is opened, and since this switch is in series with the switch 139 and the windings of the relays 151 and 161, the solenoids 135 and 136 cannot be energized. The clutch 24 is, however, engaged by means of the taxi-push valve 67 without energization of the relay 136, and the power train through the transmission is completed through this clutch, as has been hereinbefore described.

The illustrated transmission control arrangement includes mechanism for shifting the transmission from high speed ratio to a second speed positive drive, so that the motor 14 may be used as a brake, when the vehicle is traveling down an incline. As has been hereinbefore described, the sun gear 36 is not at the rearward limit of its movement when the shaft 11 is driven in direct drive from the shaft 10; the sun gear 36 is rather at an intermediate position in which it is shown in Fig. 1. Although the clutch 15 may be disengaged with the clutch 24 remaining engaged to shift the transmission to second speed; if the vehicle is traveling down an incline and the shaft 11 tends to drive, the reaction on the sun gear 36 will be in the forward direction which will tend to maintain the brake 37 disengaged, and there will be no power train between the shaft 11 and the shaft 10. We, therefore, provide mechanism for momentarily accelerating the motor 14 when it is desired to shift the transmission from high speed ratio to a positive drive second speed ratio with the vehicle traveling down an incline, in order to engage the positive brake 37 to complete a power train between the shaft 11 and the shaft 10.

The second speed lock-up control includes a control plunger 170 (see Fig. 4) which is located so as to be accessible by the operator of the vehicle, such as on the dash board (not shown) of the vehicle. The plunger 170 is connected with a link 171 which at one end is connected with the switch 142 and at the other end is connected with a carburetor control link 172. The link 172 is connected with a carburetor control lever 113 having a pawl 174 disposed in a suitable cavity therein which is acted on by a spring 175. The lever 173 is coaxially disposed with respect to the throttle control lever 167, and the pawl 174 cooperates with a notch 176 provided in the control lever 167, so that as the lever 173 is moved in a counterclockwise direction by means of the link 172, the pawl moves the throttle lever 167 from its closed throttle position to an open throttle position. The pawl 174 is provided with a pin 177 which rides on a circular cam 178 fixed with respect to the carburetor 168. When the lever 173 is moved counterclockwise, the pin 177 rides up the cam 178 thereby moving the pawl 174 up into its cavity in the lever 173 against the action of the spring 175 to thereby disengage the pawl from the notch 176. When the pawl is thereby entirely disengaged from the notch, the control lever 167 is free to move back to its closed throttle position, and this lever has such movement under the effect of the spring means (not shown) ordinarily provided with such a throttle lever.

The plunger 170 is moved in the direction of the arrow when it is desired to shift the transmission from high speed ratio to a second speed positive drive when the vehicle is traveling down an incline. Such movement of the control plunger first causes an opening of the switch 142, and as this switch is in series with the winding 150 of the relay 151, the relay is thereby de-energized, and the solenoid 135 is also de-energized. The valve piston 76 thus moves back to its inoperative position in which it is shown in Fig. 2 to disengage the clutch 15 and to allow the spring 97 of the sun gear locking mechanism 47 to condition the locking mechanism for engagement. Since the shaft 11 has been driven in direct drive, the sun gear 36 is in its position in which it is shown in Fig. 1, the brake 37 is disengaged, the groove 49 is not beneath the beans 48, and the holding mechanism 47 thus cannot become operative. Movement of the control plunger 170 in the direction indicated after opening of the switch 142 causes movement of the link 172 to rotate the carburetor lever 173 in the counterclockwise direction to open the throttle. This opening of the throttle causes a drive from the drive shaft 10 to the driven shaft 11 so that the reaction on the sun gear 36 reverses to be in the reverse direction, and the sun gear 36 thus moves rearwardly to engage the brake 37. When the brake 37 is engaged, the groove 49 is beneath the beans 48, and the beans move into the groove with a rotation of the sleeve 51 under the influence of the spring 97, and the locking mechanism 47 is then effective to hold the positive brake in locked-up condition. A positive second speed drive then exists through the transmission, and the engine 14 functions as a brake with respect to the driven shaft 11 for braking the vehicle. The continuous movement of the control plunger 170 causes continuous movement in the counterclockwise direction of the lever 173, and such movement of this lever causes a disengagement of the pawl 174 with the throttle lever 167, as has been described, and the throttle lever 167 returns to its closed throttle position. The movement of the plunger 170 is intended to be a continuous movement so that the carburetor 168 is only momentarily opened by the carburetor lever 173, and this is sufficient to complete the second speed positive drive through the transmission. The control plunger 170 is allowed to remain in its retracted position with the switch 142 being open in order to maintain the transmission in second speed positive drive.

The operation of the transmission control arrangement as a whole is as follows: When the switch 139 is conditioned for forward drive and the ignition switch 137 is closed, the relay 151 and the solenoid 135 will be energized. The valve piston 76 will be shifted by the solenoid 135 to render the holding mechanism 47 ineffective and to condition the friction clutch 15 for engagement. When the speed of the drive shaft 10 thereafter reaches a predetermined value, the centrifugal weights 22 will engage the clutch 15. The reaction on the sun gear 36 will be in the reverse direction, and the spiral gearing on the gears 35 and 36 will shift the sun gear to engage the brake 37. The first speed power train will thus be completed through the transmission.

When the speed of the driven shaft 11 and thereby of the vehicle have reached predetermined values, the contact 153 of the governor will make contact with the contact 159. The relay 151 will thereby be de-energized and the relay 161 will be energized through the contacts 146 of the switch 139. The solenoid 135 will be de-energized and the solenoid 136 will be energized; and the valve piston 78 will be moved to operative position to engage the clutch 24 while the valve piston 76 will be moved to inoperative position to disengage the clutch 15 and to render the holding mechanism 47 operative. The transmission will then be in second speed positive drive.

While the transmission is in second speed, if the operator releases the accelerator 164, the relay 151 will be again energized through a circuit including the switches 141 and 140, and the valve piston 76 will again shift to its operative position to engage the clutch 15 and to disengage the sun gear holding mechanism 47. The transmission, with both of the clutches 15 and 24 being engaged, will be in direct drive. The transmission will remain in direct drive when the accelerator 164 is depressed, as a circuit for maintaining the winding 150 of the relay 151 energized will be completed through the contacts 169 of the relay 151.

While the transmission is in direct drive, the operator may down-shift the transmission by moving the accelerator 164 to its open throttle position to open the switch 140. Such opening of the switch 140 will de-energize the winding 150 of the relay 151 so that the solenoid 135 is de-energized. Such de-energization of the solenoid will disengage the clutch 15 and will render the clutch locking mechanism 47 operative. Assuming the shaft 10 is driven, the transmission will then be in second speed positive drive.

For reverse, the pawl 43 is engaged with the teeth 42 on the ring gear 30 by means of the control lever 115, and appropriate movement of the lever 115 also causes a movement of the shift rail 108 so that the sun gear 36 cannot move rearwardly to engage the brake 37. The switch 139 is also conditioned for reverse drive, and this switch completes a circuit through the winding 150 of the relay 151, through the switch 142 and the contacts 152 and 153 to energize the relay and to energize the solenoid 135. Such energization of the solenoid causes an engagement of the friction clutch 15, and a reverse drive is thus completed through the transmission.

In order to put the transmission in second speed positive drive when the vehicle is descending an incline, the control plunger 170 is moved in the direction indicated in Fig. 4, and the switch 142 is thereby opened and the carburetor 168 is thereafter momentarily opened. The opening of the switch 142 de-energizes and maintains de-energized the relay 151 with a resultant de-energization of the solenoid 135. The clutch 15 is thus disengaged and the clutch locking mechanism 47 is conditioned for engagement. The momentary driving of the shaft 10 by the opening of the throttle causes a reverse reaction on the sun gear 36 to engage the positive brake 37 and to render the clutch locking mechanism 47 effective. The transmission is then in second speed positive drive and is maintained in such drive as long as the control plunger 170 is maintained in its withdrawn position and the speed of the vehicle is above the critical governor speed.

In order to condition the transmission for taxi-push, the lever 102 is moved to its taxi-push position to thereby shift the collar 46, to open the switch 138, and to move the valve piston 68. Such movement of the valve piston connects the pump 59 with the main sump 56 and directs the output of this sump into the bleed conduit 98 of the valve 75 to the friction clutch 24 to engage this clutch. With the shaft 11 being driven by pushing the vehicle, the reaction on the sun gear 36 is in the forward direction, and the sun gear is thereby moved by the spiral gearing on the sun gear and on the planet gear 35 to engage the clutch teeth 54. A power train is thereby completed through the transmission for driving the shaft 10 from the shaft 11. When the engine 14 begins to operate, the shaft 10 is thereby driven, and the reaction of the sun gear 36 reverses in direction whereby the clutch teeth 54 disengage.

We wish it to be understood that our invention is not to be limited to the specific constructions and arrangements shown and described, except only insofar as the claims may be so limited, as it will be apparent to those skilled in the art that changes may be made without departing from the principles of the invention.

We claim:

1. In power transmission mechanism, the combination of a drive shaft, a driven shaft, gear means for providing low and intermediate reduced speed ratios and a direct drive ratio between said shafts, said gear means including a movable reaction element for completing said reduced speed ratios when held stationary, a brake for said reaction element for holding the reaction element stationary to complete the reduced speed ratios when said element is in engagement with said brake, means for locking said reaction element in engagement with said brake mechanism, and means for automatically shifting the transmission mechanism from low to intermediate to direct drive ratios, said shifting means including means for operating said locking means for rendering said locking means effective in one but not the other of said reduced speed ratios.

2. In power transmission mechanism, the combination of a drive shaft, a driven shaft, gear means for providing low and intermediate reduced speed ratios and a direct drive ratio between said shafts, said gear means including a reaction element for completing said reduced speed ratios when held stationary, a positive type brake for the reaction element, means for moving the reaction element as a whole according to the direction of reaction thereon to thereby engage and disengage said positive brake whereby the reaction element is braked for only one direction of reaction thereon, means for locking the reaction element in its position in which the positive brake is engaged, and means for automatically shifting the transmission mechanism from low to intermediate to direct drive ratios and for rendering said reaction element locking means effective in said intermediate ratio but not in said low speed ratio.

3. In power transmission mechanism, the combination of a drive shaft, a driven shaft, gearing for providing a lower and a higher speed ratio between said shafts, said gearing including a movable reaction element for completing said speed ratios when the element is held stationary, a brake mechanism for engaging said reaction element for completing said speed ratios, means for locking said reaction element in engagement with said brake mechanism, means including a governor for automatically shifting the power transmission from the lower to the higher speed ratio, and means actuated by said shifting means for rendering said locking means effective just prior to the shift from the lower to the higher speed ratio.

4. In power transmission mechanism, the combination of a drive shaft, a driven shaft, gearing for providing a lower and a higher speed ratio between said shafts, said gearing including a movable reaction element for completing said speed ratios when the element is held stationary, a brake mechanism for holding said reaction element stationary to complete said speed ratios, means for locking said reaction element in engagement with said brake mechanism, a pair of clutches each engageable between said shafts for providing one of said speed ratios, means for automatically engaging one of said clutches to provide said higher speed ratio and for disengaging the low speed ratio clutch, and means actuated by said clutch engaging means for rendering said locking means effective just prior to the disengagement of said low ratio clutch.

5. In power transmission mechanism, the combination of a drive shaft, a driven shaft, gearing for providing a lower and a higher speed ratio between said shafts, said gearing including a movable reaction element for completing said speed ratios when the element is held stationary, a brake mechanism for holding said reaction element stationary to complete said speed ratios, means for locking said reaction element in engagement with said brake mechanism, a clutch engageable between said shafts for providing said lower speed ratio between said shafts, a clutch engageable between said shafts for providing said higher speed ratio between said shafts, means for automatically shifting the power transmission from the lower to the higher speed ratio and including a fluid pressure actuated piston for each of said clutches, and a piston actuated by fluid pressure applied to the low speed clutch for rendering said locking means ineffective just prior to engagement of the low speed clutch and for rendering the locking means effective just prior to disengagement of the low speed clutch.

6. In power transmission mechanism, the combination of a drive shaft, a driven shaft, gearing for providing low and intermediate reduced speed ratios and a direct drive ratio between said shafts, said gearing including a movable reaction element for completing said reduced speed power train when said element is held stationary, a positive type brake for the reaction element, means for moving the reaction element as a whole according to the direction of reaction thereon to thereby engage and disengage said positive brake whereby the reaction element is braked for only one direction of reaction thereon, means for locking the reaction element in its position in which the positive brake is engaged, a clutch engageable between said shafts for completing said low speed ratio and a clutch engageable between said shafts for completing said intermediate speed ratio, said clutches when both are engaged providing said direct drive ratio between said shafts, a piston for engaging each of said clutches, and fluid pressure means for automatically shifting the transmission mechanism from low to intermediate to direct drive ratios, said fluid pressure means including a piston connected with said piston for the low speed clutch and actuated for rendering said locking means ineffective just prior to engagement of the low speed clutch and for rendering the locking means effective just prior to the disengagement of the low speed clutch.

7. In power transmission mechanism for an automotive vehicle, the combination of a drive shaft, a driven shaft, gearing for providing low and intermediate reduced speed power trains and a direct drive power train between said shafts, friction clutch means engageable between said shafts for completing said power trains, a governor responsive to the speed of one of said shafts, an accelerator for the motor of the vehicle, and means interconnecting said clutch means, said accelerator and said governor whereby the governor functions to shift the transmission mechanism from low to intermediate speed when the speed of said one of said shafts increases above a predetermined value and the transmission may be shifted thereafter from intermediate speed to direct drive by an operative stroke of the accelerator.

8. In power transmission mechanism for an automotive vehicle, the combination of a drive shaft, a driven shaft, gearing for providing low and intermediate reduced speed power trains and a direct drive power train between said shafts, a friction clutch engageable between said shafts for completing said low speed power train, a friction clutch engageable between said shafts for completing said intermediate speed power train, said clutches when both are engaged completing said direct drive power train, a governor responsive to the speed of said driven shaft, an accelerator for the motor of the vehicle, and means interconnecting said clutches, said accelerator and said governor whereby the governor functions to disengage the low speed clutch and to engage the intermediate speed clutch to shift the transmission mechanism from low to intermediate speed and whereby the accelerator thereafter on an operative stroke thereof functions to engage said low speed clutch, with said intermediate speed clutch remaining engaged, to thereby shift the transmission mechanism to direct drive.

9. In power transmission mechanism for an automotive vehicle, the combination of a drive shaft, a driven shaft, gearing for providing low and intermediate reduced speed power trains and a direct drive power train between said shafts, a friction clutch engageable between said shafts for completing said low speed power train, a friction clutch engageable between said shafts for completing said intermediate speed power train, said clutches when both are engaged completing said direct drive power train, a fluid pressure operated piston for each of said clutches for engaging them, a source of fluid pressure, a valve for each piston and effective between said fluid pressure source and the respective pistons, an accelerator for the motor of the vehicle, a governor responsive to the speed of said driven shaft, and electrical means interconnecting said valves, said accelerator and said governor whereby one of said valves is effective to cause engagement of said low speed clutch below a predetermined speed of said driven shaft and the governor functions to move both of the valves to cause disengagement of said low speed clutch and engagement of said intermediate speed clutch when the speed of said driven shaft increases above said predetermined speed and the accelerator thereafter, on an operative stroke thereof, moves said one of said valves to cause engagement of the low speed clutch and thereby shift the transmission mechanism to direct drive.

10. In power transmission mechanism, the combination of a drive shaft, a driven shaft, means including gearing for providing a power train between said shafts, means providing a fluid sump for said gearing, a fluid pressure engaged clutch interposed between said shafts and adapted to complete the power train between said shafts, means providing a fluid sump for said clutch, a pump for supplying fluid under pressure for operating said clutch and for lubricating said gearing, said pump being connected to draw fluid from said gearing sump and being driven by said drive shaft, a pump driven by an element of said gearing and being normally connected to maintain the clutch sump drained of fluid, valve means for connecting said first-named pump with said clutch, a governor responsive to the speed of one of said shafts for operating said valve means to engage the clutch at a predetermined speed of said one shaft, a valve means for connecting said second-named pump to draw fluid out of said gearing sump and to supply fluid to said clutch for engaging the latter at speeds below said predetermined speed of said one of said shafts whereby the driven shaft may be driven to start an engine connected with said drive shaft.

11. In power transmission mechanism, the combination of a drive shaft, a driven shaft, means including gearing for providing comparatively low and high ratio power trains between said shafts, means providing a fluid sump for said gearing, a clutch interposed between said shafts and engageable by fluid under pressure for completing said high ratio power train between said shafts, a clutch interposed between said shafts and engageable in response to the speed of said drive shaft for completing said low ratio power train between said shafts, means providing a fluid sump for said first-named clutch, a pump for supplying fluid under pressure for operating said first-named clutch and for lubricating said gearing, said pump being connected to draw fluid from said gearing sump and being driven by said drive shaft, a pump driven by an element of said gearing, said last-named pump being normally connected to maintain the clutch sump drained of fluid and having its outlet connected with the outlet of said first named pump, a valve between the outlet of said pumps and said first-named clutch, a governer responsive to the speed of said driven shaft for operating said valve to effectively connect said first-named pump and said first-named clutch to engage the clutch above a predetermined speed of the shaft, and valve means selectively operable for connecting said second-named pump to draw fluid out of said gearing sump and to supply fluid to said first-named clutch for engaging the latter when the speed of said driven shaft is below said predetermined speed whereby the driven shaft may be driven to start an engine connected with said drive shaft.

12. In power transmission mechanism, the combination of a drive shaft, a driven shaft, means including gearing for providing comparatively low and high ratio power trains between said shafts, means providing a fluid sump for said gearing, a fluid pressure engaged clutch interposed between said shafts and adapted to complete said high ratio power train between said shafts and a centrifugal clutch interposed between said shafts and operable above a predetermined speed of said drive shaft and conditioned for operation by fluid under pressure for completing said low ratio power train, means providing a fluid sump for said clutches, a pump for supplying fluid under pressure for operating said clutches and for lubricating said gearing, said pump being connected to draw fluid from said gearing sump and being driven by said drive shaft, a pump driven by an element of said gearing, said last-named pump having its outlet connected with the outlet of said first named pump and being normally connected to maintain the clutch sump drained of fluid, a valve effective between said pumps and said second-named clutch for applying fluid under pressure to the clutch to condition the clutch for engagement, a valve effective between said pumps and said first-named clutch for applying fluid under pressure to engage the clutch and providing a fluid bleed passage leading to said gearing sump, a governor responsive to the speed of said driven shaft and being connected with said valves for conditioning said second-named clutch for engagement below a predetermined speed of the driven shaft and disengaging this clutch and engaging said first-named clutch above said predetermined speed, and a valve for selectively connecting said second-named pump with said gearing sump and for connecting the outlet of said second-named pump with said bleed passage whereby said second-named pump may supply fluid pressure to said first-named clutch to engage the clutch to complete a power train between said shafts below said predetermined speed of said driven shaft whereby the driven shaft may be driven to start an engine connected with said drive shaft.

13. In transmission mechanism for an automotive vehicle, the combination of a drive shaft, a driven shaft, a prime mover for driving said drive shaft, gearing for providing comparatively low and high speed ratios between said shafts, said gearing including a reaction element which when held stationary completes said low speed ratio, a one-way brake mechanism for holding said reaction element stationary for providing a free-wheeling drive in low speed ratio, the arrangement of said gearing being such that said reaction element rotates in high speed ratio and said one-way brake mechanism overruns, means for locking said one-way brake mechanism after the mechanism is engaged to provide a positive two-way drive between said shafts, means controlling the speed of the prime mover for said controlling means and said transmission mechanism, and means effective on an operative stroke of said control for first shifting the transmission mechanism from high speed ratio to low speed ratio and then momentarily operating said controlling means for driving said drive shaft to drive said driven shaft in low speed ratio whereby to cause the reaction element to engage the brake mechanism and allow it to be locked for providing a positive two-way low ratio drive.

14. In transmission mechanism for an automotive vehicle, the combination of a drive shaft, a driven shaft, an engine for driving said drive shaft, gearing for providing comparatively low and high speed ratios between said shafts, said gearing including a reaction element which when held stationary completes said low speed ratio, a one-way brake mechanism for holding said reaction element stationary, the arrangement of said gearing being such that in high speed ratio said reaction element rotates and said one-way brake mechanism overruns, means for locking said one-way brake mechanism after the mechanism is engaged to provide a positive two-way drive between the shafts, a throttle for said engine, a control for said transmission mechanism and said throttle, and means connected with said control and effective on an operative stroke of said control for first shifting the transmission mechanism from high speed ratio to low speed ratio and then momentarily opening said throttle for driving said drive shaft whereby to cause the reaction element to engage said brake mechanism and allow it to be locked for providing a positive two-way low ratio drive.

15. In transmission mechanism for an automotive vehicle, the combination of a drive shaft, a driven shaft, an engine for driving said drive shaft, gearing for providing comparatively low and high speed ratios between said shafts, said gearing including a reaction element which held stationary completes said low speed ratio, a one-way brake mechanism for said reaction element for holding the reaction element stationary to complete the low speed ratio, the arrangement of said gearing being such that in high speed ratio said reaction element rotates and said one-way brake mechanism overruns, means for locking said one-way brake mechanism after the mechanism is engaged to provide a positive two-way drive between the shafts, means for shifting the transmission mechanism from high ratio to low ratio and effective on such a shift to condition said brake locking means to be effective, a throttle for said engine, a control for said throttle and said transmission mechanism, and means connected with said control and effective on an operative stroke of said control for first causing said shifting means to shift the transmission from high speed ratio to low speed ratio and then momentarily opening said throttle for driving said drive shaft whereby to engage said brake mechanism to allow said locking means to become operative for providing a positive low ratio drive.

16. In transmission mechanism for an automotive vehicle, the combination of a drive shaft, a driven shaft, an engine for driving said drive shaft, gearing for providing comparatively low and high speed ratios between said shafts, said gearing including a reaction element which when held stationary completes said low speed ratio, a one-way brake mechanism for said reaction element for holding the reaction element stationary to complete said low speed ratio, a clutch interposed between said shafts and adapted to complete said high speed ratio, the arrangement of said gearing being such that in high speed ratio said reaction element rotates and said one-way brake mechanism overruns, means for locking said reaction element in engagement with said one-way brake mechanism when the mechanism is engaged whereby the reaction element is held against movement to provide positive two-way drive between the shafts, means interconnecting said clutch and said locking means whereby when the clutch is disengaged to provide said low speed ratio the locking means is conditioned to be effective, a throttle for said engine, a control for said throttle and said transmission mechanism, and means connected with said control and effective on an operative stroke of said control for first shifting the transmission mechanism from high speed ratio to low speed ratio and then momentarily opening said throttle for driving said drive shaft whereby to engage the brake mechanism and render said brake locking means effective for providing a positive low ratio drive.

17. In transmission mechanism for an automotive vehicle, the combination of a drive shaft, a driven shaft, an engine for driving said drive shaft, gearing for providing comparatively low and high speed ratios between said shafts, said gearing including a reaction element which when held stationary completes said low speed ratio, a one-way brake mechanism for said reaction element for holding said reaction element stationary to complete said low speed ratio, said brake mechanism comprising means for moving the reaction element as a whole in one direction or the other depending on the direction of reaction thereon and a positive brake engaged when the reaction element is moved in one direction, the arrangement of said gearing being such that in high speed ratio said reaction element rotates and said one-way brake mechanism overruns, a clutch interposed between said shafts and adapted to complete said high speed ratio when engaged, means for locking said one-way brake mechanism and including means for holding the reaction element against movement after it engages said positive brake is engaged and resilient means acting on the holding means whereby the holding means is conditioned to be effective when said positive brake is disengaged, means for shifting the transmission mechanism from high speed ratio to low speed ratio and including means interconnecting said clutch and said brake locking means whereby when the clutch is disengaged the locking means is conditioned to be operative, a throttle for said engine, a control for said throttle and for said transmission mechanism, and means connected with said control and effective on an operative stroke of said control for first shifting the transmission from high speed ratio to low speed ratio by disengaging said clutch and then momentarily opening said throttle for driving said drive shaft whereby to engage the brake mechanism and render said brake locking means effective for providing a positive low ratio drive.

18. In transmission mechanism for an automotive vehicle, the combination of a drive shaft, a driven shaft, an engine for driving said drive shaft, a throttle for said engine, gearing for providing comparatively low and high speed ratios between said shafts, said gearing including a reaction element which when held stationary completes said low speed ratio, a one-way brake mechanism for said reaction element for holding the reaction element stationary to complete said low speed ratio, said brake mechanism comprising spiral gearing for moving the reaction element as a whole in one direction or the other depending on the direction of reaction thereon and a positive brake engaged when the reaction element is moved in one direction, the arrangement of said gearing being such that in high speed ratio said reaction element rotates and said one-way brake mechanism overruns, a clutch interposed between said shafts and adapted to complete said high speed ratio when engaged; means for locking said one-way brake mechanism after the mechanism is engaged and including means for holding the reaction element against movement when the positive brake is engaged and spring means for conditioning the holding means for operation when the positive brake is not engaged, fluid pressure responsive means operative for first disengaging said clutch and thereafter conditioning said brake locking means for operation, a control for said throttle and said transmission mechanism, and means connected with said control and effective on an operative stroke of said control for first shifting the transmission from high speed ratio to low speed ratio by rendering said fluid pressure responsive means operative and then momentarily opening said throttle to cause the engine to drive said drive shaft to engage the one-way brake mechanism and cause the brake locking means to become effective for providing a positive low ratio drive through the transmission mechanism.

19. In power transmission mechanism, the combination of a drive shaft, a driven shaft, gear means for providing low and intermediate reduced speed ratios and a direct drive ratio between said shafts, said gear means including a reaction element for completing said reduced speed ratios when held stationary, brake mechanism for said reaction element arranged to automatically hold the reaction element from rotation in one direction to complete the reduced speed ratios and including locking mechanism cooperating with said brake mechanism for rendering the brake mechanism effective to hold the reaction element stationary from rotation in either direction, and means for automatically shifting the transmission mechanism from low to intermediate to direct drive ratios, said shifting means including means for operating said locking means for rendering the locking means effective in one but not the other of said reduced speed ratios.

20. In power transmission mechanism, the combination of a drive shaft, a driven shaft, gearing for providing a lower and a higher speed ratio between said shafts, said gearing including a reaction element for completing said speed ratios when the element is held stationary, brake mechanism for said reaction element arranged to automatically hold the reaction element from rotation in one direction to complete said speed ratios and including locking mechanism cooperating with said brake mechanism for rendering the brake mechanism effective to hold the reaction element stationary from rotation in either direction, means including a governor for automatically shifting the power transmission from the lower to the higher speed ratio, and means actuated by said shifting means for rendering said locking means effective just prior to the shift from the lower to the higher speed ratio.

21. In power transmission mechanism, the combination of a drive shaft, a driven shaft, gearing for providing a lower and a higher speed ratio between said shafts, said gearing including a reaction element for completing said speed ratios when the element is held stationary, brake mechanism for said reaction element arranged to automatically hold the reaction element from rotation in one direction to complete said speed ratios and including locking mechanism cooperating with said brake mechanism for rendering the brake mechanism effective to hold the reaction element stationary from rotation in either direction, a pair of clutches between said gearing and one of said shafts each for completing one of said speed ratios, means for automatically engaging one of said clutches to provide said higher speed ratio and for disengaging the lower speed ratio clutch, and means actuated by said clutch engaging means for rendering said locking means effective just prior to the disengagement of said lower ratio clutch.

DONALD W. KELBEL.
GEORGE E. FLINN.
PALMER ORR.

REFERENCES CITED

The following references are of record in the file of this patent:

UNITED STATES PATENTS

| Number | Name | Date |
|---|---|---|
| 1,843,195 | Banker | Feb. 2, 1932 |
| 2,021,165 | Barton | Nov. 19, 1935 |
| 2,054,222 | Lapsley | Sept. 15, 1936 |
| 2,154,419 | Cotterman | Apr. 18, 1939 |
| 2,193,525 | Thompson | Mar. 12, 1940 |
| 2,374,305 | Osborne | Apr. 24, 1945 |

Certificate of Correction

Patent No. 2,519,050                                   August 15, 1950

DONALD W. KELBEL ET AL.

It is hereby certified that error appears in the printed specification of the above numbered patent requiring correction as follows:

Column 6, line 9, for the word "to" before "apparent" read *be*; column 9, line 4, for "valve piston 79" read *valve piston 78*; column 21, line 75, after "mover" insert the comma and words , *a control*; column 23, line 48, strike out "is engaged";

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*